United States Patent
Yeh et al.

(10) Patent No.: US 8,892,930 B2
(45) Date of Patent: Nov. 18, 2014

(54) SYSTEMS AND METHODS FOR POWER MANAGEMENT IN ELECTRONIC DEVICES

(75) Inventors: Tzong-Kwang Henry Yeh, Palo Alto, CA (US); Tak Kwong Wong, Milpitas, CA (US)

(73) Assignee: Integrated Device Technology Inc., San Jose, CA (US)

( * ) Notice: Subject to any disclaimer, the term of this patent is extended or adjusted under 35 U.S.C. 154(b) by 1399 days.

(21) Appl. No.: 12/184,987

(22) Filed: Aug. 1, 2008

(65) Prior Publication Data
US 2010/0031073 A1 Feb. 4, 2010

(51) Int. Cl.
*G06F 1/26* (2006.01)
*G06F 1/32* (2006.01)

(52) U.S. Cl.
CPC ........... *G06F 1/3203* (2013.01); *Y02B 60/1278* (2013.01); *G06F 1/3287* (2013.01); *Y02B 60/1282* (2013.01)
USPC ........... 713/324; 713/300; 713/320; 713/323; 326/62; 326/63; 326/80

(58) Field of Classification Search
USPC ......... 713/300, 320, 324, 323; 326/62, 63, 80
See application file for complete search history.

(56) References Cited

U.S. PATENT DOCUMENTS

| | | | |
|---|---|---|---|
| 7,372,723 B1* | 5/2008 | Lu et al. | 365/158 |
| 2002/0036516 A1* | 3/2002 | Petty | 326/80 |
| 2005/0046728 A1* | 3/2005 | Schinner | 348/333.09 |
| 2005/0064829 A1* | 3/2005 | Kang et al. | 455/127.1 |
| 2008/0191331 A1* | 8/2008 | Lee et al. | 257/679 |
| 2009/0041438 A1* | 2/2009 | Kuno | 386/126 |

FOREIGN PATENT DOCUMENTS

WO  WO 2006/109581 A1  10/2006

* cited by examiner

*Primary Examiner* — Michael J Brown
(74) *Attorney, Agent, or Firm* — Hayes and Boone LLP

(57) ABSTRACT

Systems and methods are disclosed for managing power consumption in electronic devices. In certain embodiments, an integrated circuit for managing power consumption in an electronic device includes an input/output (I/O) interface, a first circuit block coupled to the I/O interface, and an interface circuit coupled between the I/O interface and the first circuit block, the interface circuit configured to provide a defined logic state to the first circuit block or a second circuit block external to the integrated circuit if one of the first circuit block or the second circuit block is powered down. By providing a defined logic state to the first circuit block or the second circuit block when one of the first circuit block or the second circuit block is powered down, power consumption of the electronic device may be reduced.

17 Claims, 5 Drawing Sheets

SYSTEMS AND METHODS FOR POWER MANAGEMENT IN ELECTRONIC DEVICES

BACKGROUND

1. Technical Field

The present invention relates to the field of power management and, in particular, to systems and methods for managing power in electronic devices.

2. Discussion of Related Art

Minimizing power consumption is an important consideration in the design of many electronic devices including, for example, cellular phones, personal digital assistants (PDAs), personal computers, and the like. Particularly, with the advent of portable electronic devices (e.g., battery-powered electronic devices), reducing overall power consumption over time has become especially important.

Modern circuits implementing high density very-large-scale integration (VLSI) designs with increasingly smaller feature sizes often exhibit undesirably high leakage current levels, thereby resulting in higher power consumption. Accordingly, reducing overall leakage current in integrated circuits is critical in reducing their overall power consumption.

Power gating is a commonly implemented technique for reducing power consumption attributed to leakage current in integrated circuits. Circuits implementing a power gating power management scheme have the ability to place circuit blocks which are idle in a low power state (e.g., sleep state) by switching off the power supplied to these blocks. To ensure that the input/output (I/O) interface(s) between the powered down circuit blocks and any active circuit blocks that interface with the powered down circuit blocks are provided with defined logic states, external power gating control logic is utilized. Implementing such external control logic, however, requires extensive modifications of the electronic device that utilizes the power gated integrated circuit. Thus, if a designer wishes to integrate power gating in a single integrated circuit within an electronic device, modifications to the electronic device external to the integrated circuit utilizing power gating are required.

Therefore, it is desirable to develop systems and methods for managing power consumption in electronic devices that reduce the problems associated with traditional power gating techniques.

SUMMARY

Consistent with some embodiments of the present invention, an integrated circuit includes an input/output (I/O) interface; a first circuit block coupled to the I/O interface configured to operate on a first supply voltage; and an interface circuit coupled between the I/O interface and the first circuit block, the interface circuit configured to provide a defined logic state to the first circuit block or a second circuit block external to the integrated circuit if one of the first circuit block or the second circuit block is powered down, the second circuit block being coupled to the integrated circuit via the I/O interface and configured to operate on a second supply voltage. In some embodiments, the defined logic state provided by the interface circuit may be the last logic state received from the first circuit block or provided by the second circuit block prior to powering down. Further, in some embodiments, the defined logic state provided by the interface circuit at the I/O interface may be a logical zero value. Additionally, in some embodiments, the defined logic state provided by the interface circuit at the I/O interface may be a logical one value.

Consistent with some embodiments of the present invention, a method for managing power consumption in an electronic device includes receiving, at an interface circuit in an integrated circuit, a digital signal at a first voltage level from a first circuit block in the integrated circuit operating at the first voltage level; translating the received digital signal at the first voltage level into corresponding a translated digital signal at a second voltage level; storing the translated digital signal at the second voltage level; powering down the first circuit block; and providing the stored translated digital signal at the second voltage level to a second circuit block external to the integrated circuit operating at the second voltage level.

Consistent with some embodiments of the present invention, a method for managing power consumption in an electronic device includes receiving, at an interface circuit in an integrated circuit, a digital signal at a second voltage level from a second circuit block external to the integrated circuit operating at the second voltage level; translating the received digital signal at the second voltage level into corresponding a translated digital signal at a first voltage level; storing the translated digital signal at the first voltage level; powering down the second circuit block; and providing the stored translated digital signal at the first voltage level to a first circuit block in the integrated circuit operating at the first voltage level.

Consistent with some embodiments of the present invention, a method for managing power consumption in an electronic device includes detecting the powering down of a first circuit block in an integrated circuit operating on a first supply voltage; and providing, to a second circuit block external to the integrated circuit operating on a second supply voltage, the second circuit block being coupled to the first circuit block, a defined logic state in response to detecting the powering down of the first circuit block.

Consistent with some embodiments of the present invention, a method of managing power consumption in an electronic device includes detecting the powering down of a second circuit block external to an integrated circuit operating on a second supply voltage; and providing, to a first circuit block in the integrated circuit operating on a first supply voltage, the second circuit block being coupled to the first circuit block, a defined logic state in response to detecting the powering down of the second circuit block.

Further embodiments and aspects of the invention are discussed with respect to the following figures, which are incorporated in and constitute a part of this specification.

In the figures, elements having the same designation have the same or similar functions. Relative sizes and distances depicted in the figures are for convenience of illustration only and have no further meaning.

DETAILED DESCRIPTION

Figure 1:
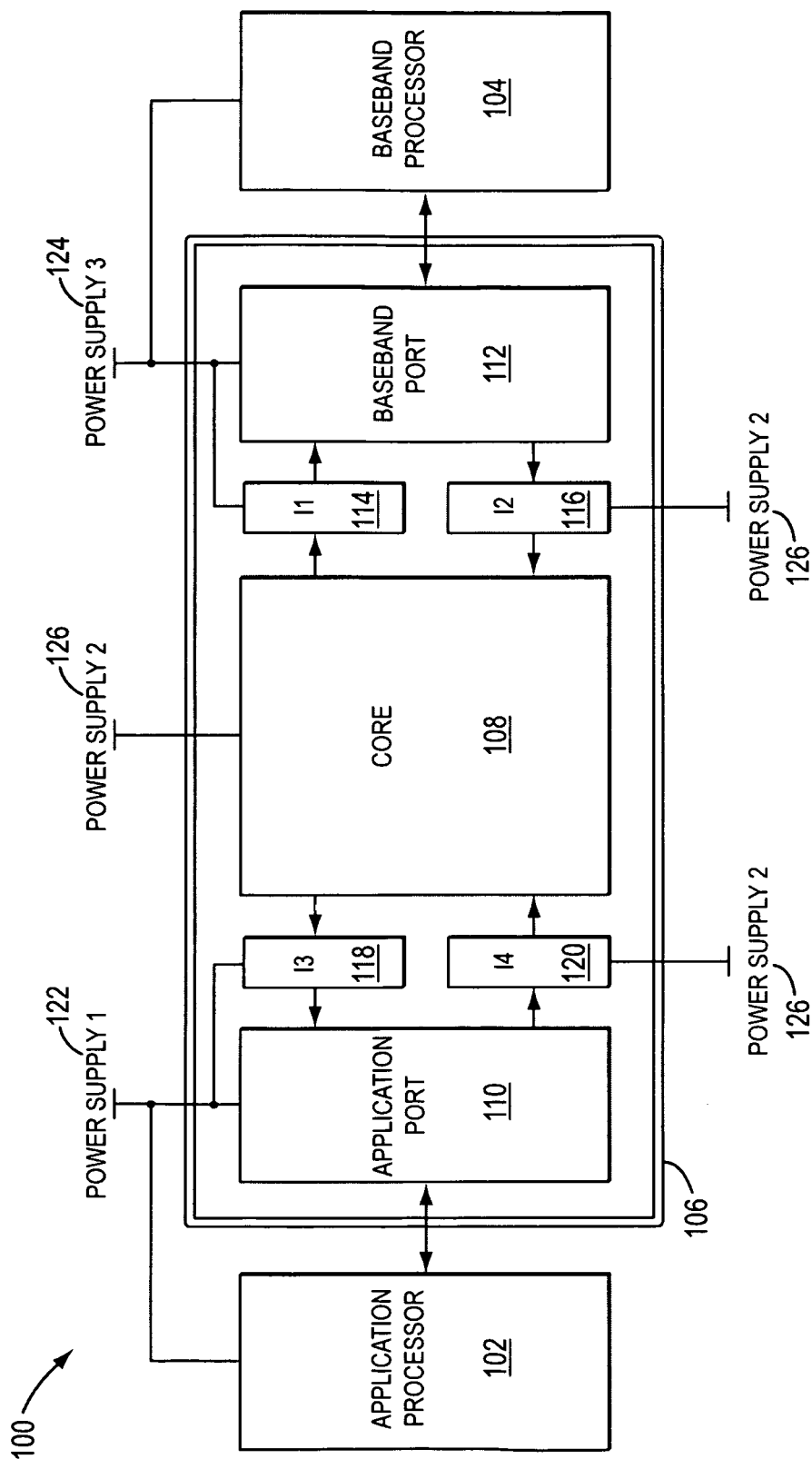
FIG. 1 illustrates an exemplary dual-port device implementing a power management architecture consistent with embodiments of the present invention.

FIG. 1 illustrates an exemplary dual-port device 106 implementing a power management architecture consistent with embodiments of the present invention. Dual-port device 106 is integrated within an electronic circuit 100 that includes an application processor 102 and a baseband processor 104. Dual-port device 106 includes an application port 110, a core processor 108, a baseband port 112, output interface circuits I1 114 and I3 118, and input interface circuits I2 116 and I4 120. Application processor 102, baseband processor 104, and core processor 108 may be any electronic circuit that is independently powered and, in some embodiments, may be described as circuit blocks (e.g., power islands). For example, application processor 102, baseband processor 104, and core processor 108 may be any logic circuit such as a memory or any other digital circuit. Further, while some embodiments of the invention are described in the context of a dual-port device, embodiments of the invention may also be integrated in a single-port device.

As illustrated in FIG. 1, application processor 102 is communicatively coupled with dual-port device 106 via application port 110. Similarly, baseband processor 104 is coupled with dual-port device 106 via baseband port 112. Core processor 108 is coupled to application port 110 via output interface circuit I3 118 and input interface circuit I4 120 and to baseband port 112 via output interface I1 114 and input interface circuit I2 116.

Electronic circuit 100 utilizes three operating voltages, denoted as power supply 1 122, power supply 2 126, and power supply 3 124. As illustrated in FIG. 1, application processor 102, application port 110, and output interface circuit I3 118 may operate in the power supply 1 122 power domain. Core processor 108 and input interface circuits I2 116 and I4 120 may operate in the power supply 2 126 power domain. Baseband processor 104, baseband port 112, and output interface circuit I1 114 may operate in the power supply 3 124 power domain. In certain embodiments, operating voltages of power supply 1 122, power supply 3 124, and power supply 2 126 may be the same operating voltage. In certain other embodiments, operating voltages power supply 1 122, power supply 3 124, and power supply 2 126 may vary with respect to each other (e.g., power supply 2<power supply 1<power supply 3).

Output interface circuits I1 114 and I3 118, and input interface circuits I2 116 and I4 120 operate to allow application processor 102, core processor 108, and baseband processor 104 to be powered down independently. Defined logic states are maintained at the input/output (I/O) interfaces of the powered down blocks and any active circuit blocks without the need for extensive external control logic integrated in electronic circuit 100 external to dual-port device 106, as is required in traditional power gating techniques. In this manner, circuit blocks (i.e., application processor 102, core processor 108, and baseband processor 104) which are idle may be switched to a low power state (e.g., a sleep state) by switching off the power supplied to these idle blocks, thereby reducing overall power consumption attributed to leakage current.

As noted above, integration of output interface circuits I1 114 and I3 118 and input interface circuits I2 116 and I4 120 into dual port device 106 allows for any of application processor 102, core processor 108, and baseband processor 104 to be powered down while maintaining defined logic states at their respective I/O interfaces. In other words, output interface circuits I1 114 and I3 118 and input interface circuits I2 116 and I4 120 ensure that if a circuit block is powered down, the signal levels provided to any active circuit blocks that interface with the powered down circuit block are have a known/defined logic state.

For example, if application processor 102 enters an idle state, supply voltage power supply 1 122 may be switched off (i.e., powered down) to reduce the power consumption of electronic circuit 100 attributable to leakage current in application processor 102. Input interface circuit I4 120 ensures that the signal provided from application processor 102 to core processor 108 via application port 110 has a defined logic state even when application processor 102 and application port 110 are powered down by detecting when application processor 102 and application port 110 are entering a power down state and, upon detecting a power down, latching to (i.e., storing) a defined logic state prior to the shutdown of application processor 102 and application port 110. As input interface I4 120 operates in the power supply 2 126 power domain, the latched logic state input interface I4 120 stores is provided to core processor 108 as an input, regardless of whether application processor 102 and application port 110 have been powered down (i.e., regardless of whether power supply 1 122 has been switched off). Accordingly, application processor 102 and application port 110 operating in the power supply 1 122 power domain may be powered down without their output signals as received by the core processor 108 is in a transitional logic state as their output signals transition to zero.

In the context of powering down core processor 108 in the power supply 2 126 power domain while application processor 102 remains in an active state, output interface I3 118 operates similarly. Output interface I3 118 translates the output signal provided from core processor 108 to application processor 102 via application port 110 from the power supply 2 126 power domain to the power supply 1 122 power domain and latches this translated output state. Accordingly, as output interface I3 118 operates in the power supply 1 122 power domain, the last defined logic state is translated and stored by output interface I3 118 and, therefore, continues to be provided to application processor 102 via application port 110 as an input, regardless of whether core processor 108 has been powered down (i.e., regardless of whether power supply 2 126 has been switched off). Accordingly, core processor 108 operating in the power supply 2 power domain can be powered down without its output signals as received by application processor 102 via application port 110 being set to a transitional logic state.

Output interface I1 114 and input interface I2 116 operate similarly to the above-described operation of output interface I3 118 and input interface I4 120 in the context of core processor 108 operating in the power supply 2 126 power domain and baseband processor 104 and baseband port 112 operating in the power supply 3 124 power domain. For example, output interface I1 114 ensures that baseband processor 104 receives a defined logic state from core processor 108, regardless of whether core processor 108 has been powered down. Accordingly, when core processor 108 is powered down (i.e., power supply 2 126 is switched off), output interface I1 114 translates and latches the last defined output state of core processor 108 prior to core processor 108 powering down, and provides this last output signal to baseband processor 104 via baseband port 112. Similarly, input interface I2 116 ensures that core processor 108 receives a defined logic state from baseband processor 104 via baseband port 112, regardless of whether baseband processor 104 and baseband port 112 have been powered down. Accordingly, when power supply 3 124 powers down, input interface I2 116 detects the power down state and latches to a defined logic state, providing this defined logic state as an input signal to core processor 108.

Input interface circuits I2 116 and I4 120 and/or output interface circuits I1 114 and I3 118 may be used for every I/O signal line (e.g., data, byte enable, chip select, ect.) coupling application processor 102, core processor 108, and baseband processor 104. Accordingly, while FIG. 1 illustrates single input and output signal lines coupling application processor 102 to core processor 108 and core processor 108 to baseband processor 104, in certain embodiments electronic circuit 100 may integrate multiple signal lines between circuit blocks that include additional input interface circuits I2 116 and I4 120 and/or output interface circuits I1 114 and I3 118.

As discussed above in reference to FIG. 1, output interface circuits I1 114 and I3 118 and input interface circuits I2 116 and I4 120 are integrated within dual-port device 106. Accordingly, in certain embodiments, the power management architecture implemented in dual-port device 106 requires little to no external modifications of electronic circuit 100 to operate, as would otherwise be required if traditional power gating techniques were utilized. In other words, a user of dual port device 106 can implement power management techniques where device 106 responds appropriately without the implementation of other circuitry. In this manner, dual-port device 106 offers a transparent and portable solution for managing power consumption in an electronic circuit 100 that includes discrete integrated devices.

Figure 2:
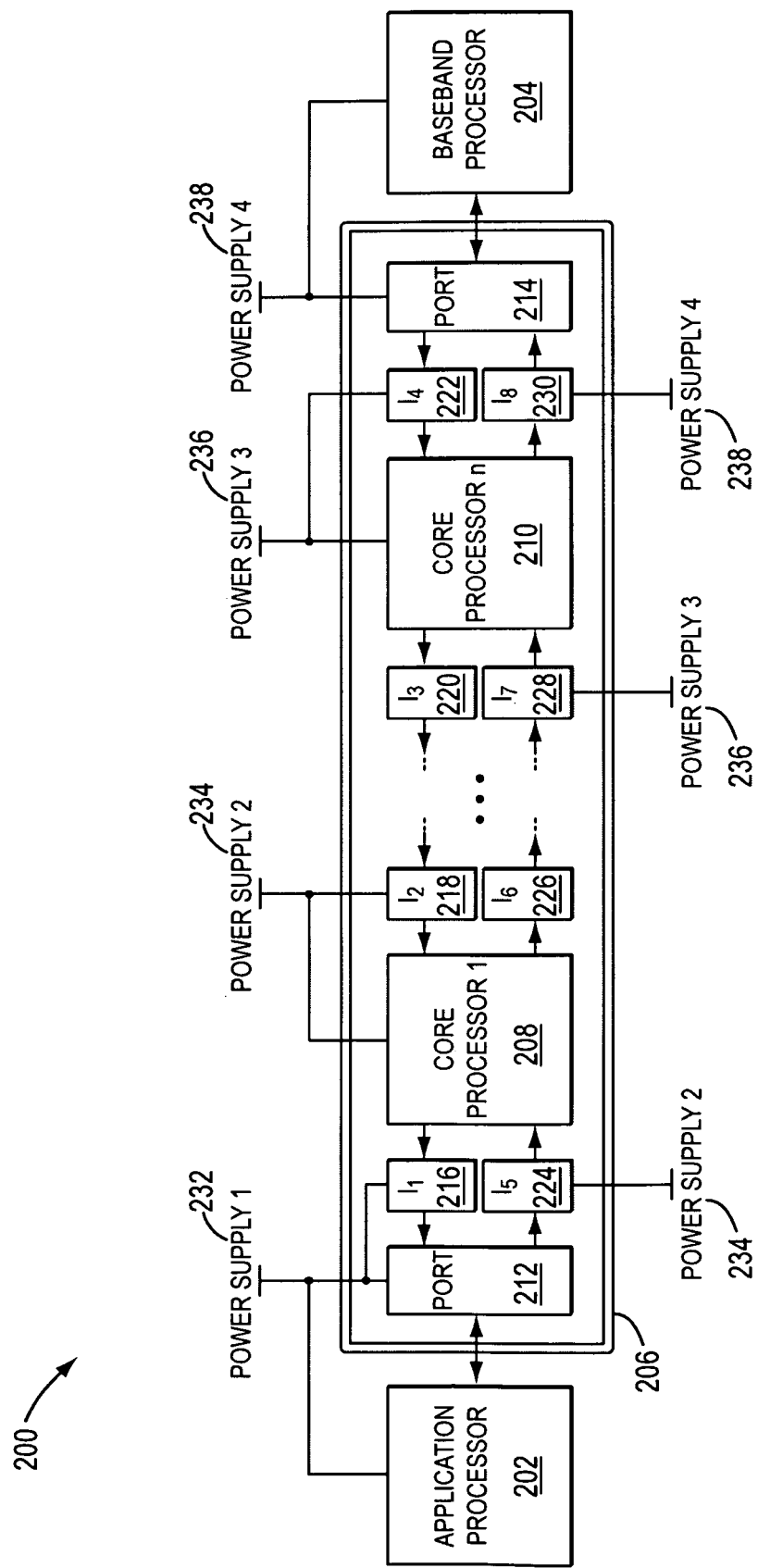
FIG. 2 illustrates another exemplary dual-port device implementing a power management architecture consistent with embodiments of the present invention.

FIG. 2 illustrates another exemplary dual-port device 206 implementing a power management architecture consistent with embodiments of the present invention. Dual-port device 206 is integrated within an electronic circuit 200 that includes an application processor 202 and a baseband processor 204. Dual-port device 206 includes ports 212 and 214, n core processors 208-210, and interface circuits I1-I8 216-230. In certain embodiments, dual-port device 206 may include a plurality of independently powered circuit blocks.

As illustrated in FIG. 2, application processor 202 is coupled with dual-port device 206 via port 212. Similarly, baseband processor 204 is coupled with dual-port device 206 via port 214. Core processor 1 208 is coupled to port 212 via interface circuits I1 216 and I5 224. Core processor n 210 is coupled to port 214 via interface circuits I4 222 and I8 230. In certain embodiments, dual-port device 206 may include other independently powered circuit blocks (e.g., additional processors and other circuit components) not specifically illustrated in FIG. 2. In such embodiments, interface circuit I2 218, I3 220, I6 226, and I7 228 may be coupled with these other independently powered circuit blocks.

Electronic circuit 200 may utilize a plurality of operating voltages, including power supply 1 232, power supply 2 234, power supply 3 236, and power supply 4 238, as illustrated in FIG. 2. Application processor 202, port 212, and interface circuit I1 216 may operate in the power supply 1 232 power domain. Core processor 1 208 and interface circuits I2 218 and I5 224 may operate in the power supply 2 234 power domain. Core processor n 210 and interface circuits I4 222 and I7 228 may operate in the power supply 3 236 power domain. Baseband processor 204, port 214, and interface circuit I8 230 may operate in the power supply 4 238 power domain. Additional operating voltages may be used to power other independently powered circuit blocks not specifically illustrated in FIG. 2.

In certain embodiments, the operating voltages utilized in electronic circuit 200 may be the same operating voltage. In certain other embodiments, the operating voltages utilized in electronic circuit 200 may vary with respect to each other (e.g., power supply 1<power supply 2<power supply 3>power supply 4).

Interface circuits I1-I8 216-230 operate to allow independently powered idle circuit blocks of electronic circuit 200 (i.e., application processor 202/port 212, core processor 1 208, core processor n 210, and baseband processor 204/port 214) to be powered down (i.e., switched off) while maintaining defined logic states at the I/O interfaces of the powered down blocks and any active circuit blocks. In other words, interface circuits I1-I8 216-230 ensure that if a circuit block is powered down, the signal levels provided to any active circuit blocks that interface with the powered down circuit block have a known, defined, state. In this manner, power consumption attributed to leakage current in the idle circuit blocks is reduced, while the logic states at the I/O interfaces of the powered down blocks and any active circuit blocks remain defined.

For example, interface circuit I5 224 operates to ensure that if application processor 202 and port 212 enter an idle state and are powered down (e.g., power supply 1 is switched off), the input to core processor 1 208 from application processor 202 via port 212 remains at a defined logic state. Similarly, interface circuit I1 216 operates to ensure that if core processor 1 208 enters an idle state and is powered down (i.e., power supply 2 is switched off), the input to application processor 202 via port 212 remains at a defined logic state. Interface circuits I2-I5 218-222 and I6-I8 226-230 operate similarly with respect to maintaining defined states at I/O interfaces of active circuit blocks (i.e., application processor 202, core processors 1-n 208-210, and/or baseband processor 204) regardless of whether any idle circuit blocks coupled with the active circuit blocks are powered down.

Interface circuits I1-I8 216-230 may be used for every I/O signal line coupling application processor 202, core processors 1-n 208-210, baseband processor 204, and/or any other circuit block included in electronic circuit 200. Accordingly, while FIG. 2 illustrates single input and output signal lines coupling application processor 202 to core processor 1 208, core processor 1 208 to core processor n 210, and/or core processor n 210 to baseband processor 204, in certain embodiments, electronic circuit 200 may integrate multiple signal lines between circuit blocks that include additional interface circuits I1-I8 216-230.

As discussed above in reference to FIG. 2, interface circuits I1-I8 216-230 are integrated within dual-port device 206. Accordingly, in certain embodiments, the power management architecture implemented in dual-port device 206 requires little to no external modifications of electronic circuit 200 to operate as would otherwise be required if traditional power gating techniques were utilized. In this manner, dual-port device 206 offers a transparent and portable solution for managing power consumption in an electronic circuit 200 that includes discrete integrated devices.

Figure 3:
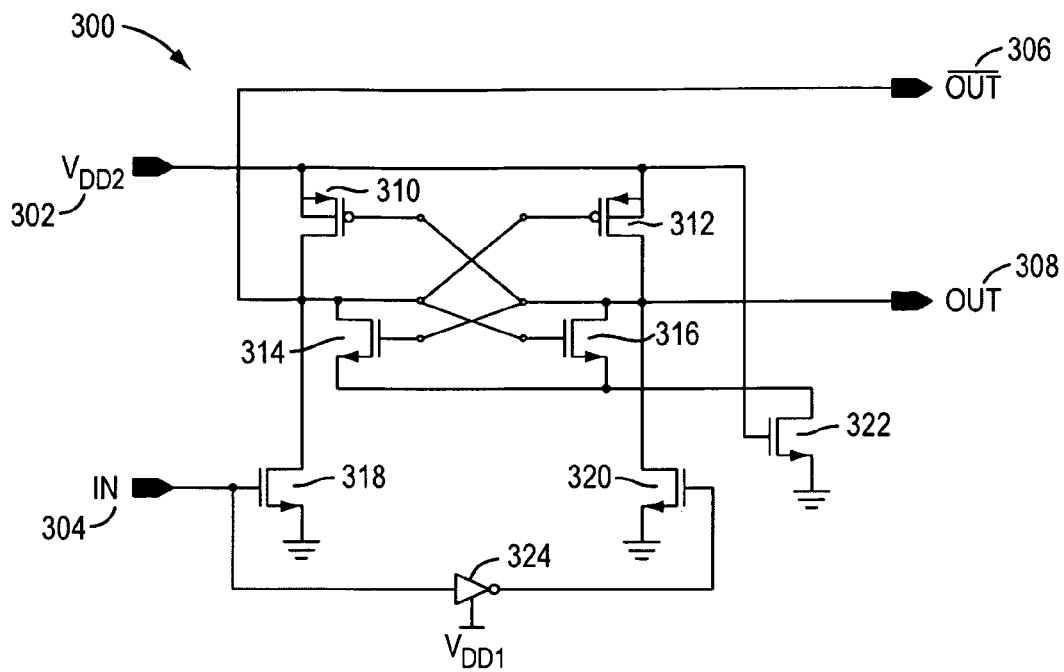
FIG. 3 illustrates a schematic diagram of an exemplary interface circuit consistent with embodiments of the present invention.

FIG. 3 illustrates a schematic diagram of an exemplary interface circuit 300 consistent with embodiments of the present invention. Interface circuit 300 may be utilized as interfaces 114-120 of FIG. 1 or interfaces 216-230 of FIG. 2. Particularly, interface circuit 300 is configured to interface a circuit block operating in a power domain denoted as VDD2 with a circuit block operating in a power domain denoted as VDD1, where VDD1 is capable of being powered down. Interface circuit 300 includes p-channel metal-oxide-semiconductor (pMOS) transistors 310-312, n-channel metal-oxide-semiconductor (nMOS) transistors 314-322, inverter 324, input 304, outputs 306 and 308, and power input 302.

As illustrated in FIG. 3, the sources of pMOS transistors 310 and 312 and the gate of nMOS transistor 322 are coupled to power input 302, which is coupled to a supply voltage operating in the VDD2 power domain. The drain of pMOS transistor 310 is coupled to the drain of nMOS transistor 314, the gate of pMOS transistor 312, the gate of nMOS transistor 316, and the drain of nMOS transistor 318. The drain of pMOS transistor 312 is coupled to the drain of nMOS transistor 316, the gate of pMOS transistor 310, the gate of nMOS transistor 314, and the drain of nMOS transistor 320. The source of nMOS transistor 314 is coupled to the source of nMOS transistor 316 and the drain of pMOS transistor 322. The gate of nMOS transistor 318 is coupled to input 304 and the input of inverter 324. The gate of nMOS transistor 320 is coupled to the output of inverter 324. The sources of nMOS transistors 318-322 are coupled to ground. Inverter 324 may be powered in the VDD1 power domain. Outputs 306 and 308 are provided from the drains of pMOS transistors 310 and 312 respectively.

Interface circuit 300 implements a level translator (e.g., a level shifter) that includes pMOS transistors 310-312 and nMOS transistors 318-320 configured to translate an input signal provided at input 304 in the VDD1 power domain to the VDD2 power domain and a latch (i.e., a storage device) that includes nMOS transistors 314-316 and 322 and pMOS transistors 310-312 capable of storing a logic state translated by the level translator in the VDD2 power domain and providing this stored logic state at outputs 306 and 308. A signal provided at input 304 is translated into the VDD2 power domain and its corresponding logic state is stored by interface circuit 300 at the circuit nodes corresponding with outputs 306-308. Inverter 324, powered by VDD1, is configured to output a logical zero upon shutdown of VDD1. nMOS transistor 318 is configured such that the voltage at its drain is not pulled down to ground when input 304 is transitioning to a digital zero state (i.e., nMOS transistor 318 remains switched off when input 304 is transitioning to zero due to the powering down of VDD1). In this manner, if a circuit block operating in the VDD1 power domain that provides a signal to input 304 is powered down, the last known logic state received by input 304 is maintained (e.g., stored or latched) in the VDD2 power domain by interface circuit 300. This stored defined logic state may then be provided to an active circuit block operating in the VDD2 domain coupled to the powered down circuit block via interface circuit outputs 306 and 308. Accordingly, the I/O interface between the powered down circuit block and the active circuit block has a defined logic state at all times.

In certain embodiments, interface circuit 300 is configured to reduce the power consumption of the active circuit block operating in the VDD2 power domain as the circuit block operating in the VDD1 power domain is powered down. For example, as the signal received at input 304 transitions to zero, nMOS transistor 318 will shut off, thereby reducing leakage current interface circuit 300 as input 304 transitions to zero. In contrast, if an inverter circuit, which conventionally is a pMOS transistor in series with an nMOS transistor, is utilized, as the signal transitions from logic state one to a logic state of zero, a significant period of time is spend where both transistors are on. Therefore, a significant amount of current is consumed.

Figure 4:
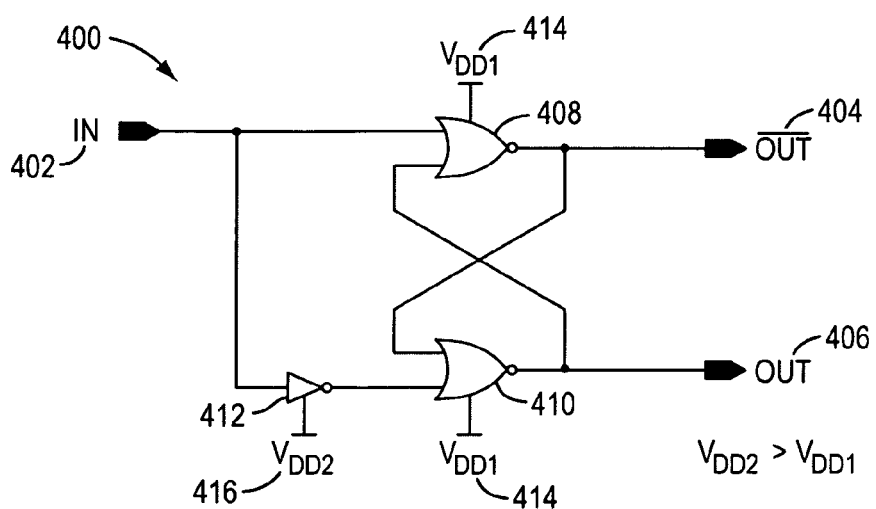
FIG. 4 illustrates a schematic diagram of an exemplary interface circuit consistent with embodiments of the present invention.

FIG. 4 illustrates a schematic diagram of an exemplary interface circuit 400 consistent with embodiments of the present invention. Interface circuit 400 may be utilized as interfaces 114-120 of FIG. 1 or interfaces 216-230 of FIG. 2. Particularly, interface circuit 400 is configured to interface a circuit block operating in a power domain denoted as VDD2 416 with a circuit block operating in a power domain denoted as VDD1 414, where VDD2≥VDD1 and VDD2 is capable of being powered down. Interface circuit 400, in contrast to interface circuit 300, is limited, however, to situations where VDD2≥VDD1, or very nearly so. Interface circuit 400 includes inputs 402, power input VDD2 416, power input VDD1 414, NOR gates 408 and 410, inverter 412, and outputs 404 and 406.

As illustrated in FIG. 4, NOR gates 408-410 may be powered by VDD1 414 and inverter 412 may be powered by VDD2 416. Input 402 is coupled to the input of inverter 412 and one of the inputs of NOR gate 408. The output of inverter 412 is coupled to one of the inputs of NOR gate 410. The output of NOR gate 408 is coupled to the other input of NOR gate 410. Similarly, the output of NOR gate 410 is coupled to the other input of NOR gate 408. NOR gates 408 and 410 may be powered in the VDD1 414 power domain. Outputs 404 and 406 are provided from the outputs of NOR gates 408 and 410 respectively.

Interface circuit 400 implements a crosslatch that includes NOR gates 408 and 410 configured to store a logic state in the VDD1 414 power domain that was provided to input 402 in the VDD2 416. Accordingly, when a signal having a defined logic state in the VDD2 416 power domain is provided to input 402, the corresponding defined logic state in the VDD1 414 power domain is stored by the crosslatch, which may then be provided at outputs 404 and 406. Inverter 412, powered by VDD2 416, is configured to output a logical zero upon shutdown of VDD2 416. Further, NOR gate 408 is configured such that an input transitioning to a zero state received by NOR gate 408 does not trigger a change in its output. In this manner, if a circuit block operating in the VDD2 416 power domain that provides a signal to input 402 is powered down, the last known logic state provided by the powered down circuit block received by input 302 is stored in the VDD1 414 power domain by the crosslatch circuit. This stored defined logic state may then be provided to an active circuit block operating in the VDD1 414 power domain coupled to the powered down circuit block via outputs 404 and 406. Accordingly, the I/O interface between the powered down circuit block and the active circuit block has a defined logic state at all times.

For example, if prior to the powering down of VDD2 416, the signal provided to one of the inputs of NOR gate 408 by input 402 is set to a logical zero value, the output of inverter 412 will be set to a logical one value. As the input of NOR gate 410 provided by the output of inverter 412 is set to a logical one value, the output of NOR gate 410 is set to a logical zero value. As the output of NOR gate 410 is provided to the other input of NOR gate 408, the output of NOR gate 408 will be set to a logical one value. In this manner, output 406 mirrors input 402, whereas output 404 is the inverse of input 402.

When VDD2 416 is powered down, the output of inverter 412 is transitioning to a logical zero value. As NOR gate 408 is configured such that an input transitioning to a zero state received by NOR gate 408 does not trigger a change in its output 404, its output 404 will remain set at a logical one value following the powering down of VDD2 416. As output 404 is provided as one of the inputs of NOR gate 410, the output of NOR gate 410 will remain set at a logical zero value. In this manner, the crosslatch circuit of interface circuit 400 preserves the last known logic state in the VDD1 414 power domain provided by the powered down circuit block received at input 302.

In certain embodiments, interface circuit 400 is configured to reduce the power consumption of the active circuit block operating in the VDD1 power domain as the circuit block operating in the VDD2 power domain is powered down. For example, as the signal received at input 402 transitions to zero, an nMOS transistor integrated in NOR gate 408 may shut off, thereby reducing leakage current interface circuit 400 as input 402 transitions to zero.

Figure 5:
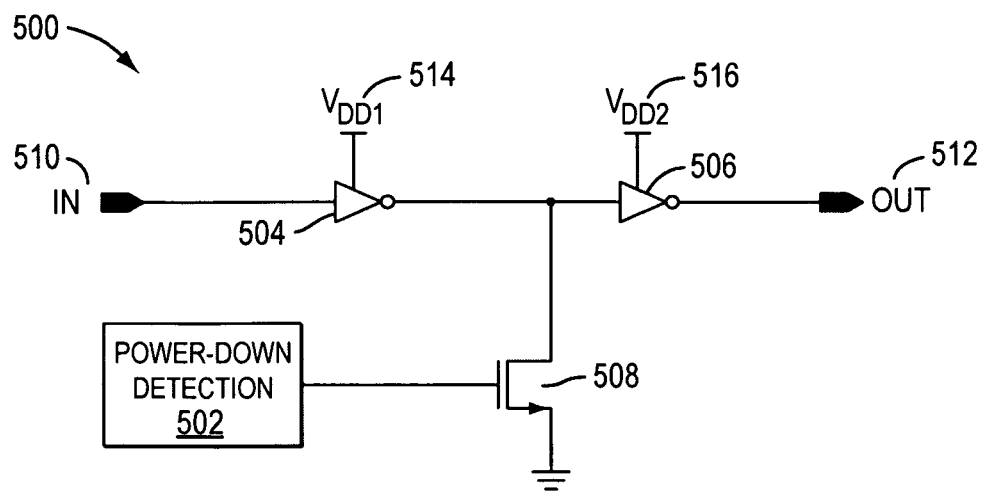
FIG. 5 illustrates a schematic diagram of an exemplary interface circuit consistent with embodiments of the present invention.

FIG. 5 illustrates a schematic diagram of an exemplary interface circuit 500 consistent with embodiments of the present invention. Interface circuit 500 may be utilized as interfaces 114-120 of FIG. 1 or interfaces 216-230 of FIG. 2. Interface circuit 500 includes input 510, inverters 504 and 506, VDD1 power input 514, VDD2 power input 516, power-down detection circuit 502, nMOS transistor 508, and output 512. In certain embodiments (e.g., when VDD1≥VDD2), power-down detection circuit 502 may be as simple as an inverter powered by VDD2 516 having its input coupled to VDD1 514. In certain other embodiments, exemplary interface circuit 500 may be a digital circuit having similar functionality to interface circuit 500 as shown in FIG. 5.

As illustrated in FIG. 5, input 510 is coupled to the input of inverter 504. The output of inverter 504 is coupled to the input of inverter 506 and the drain of nMOS transistor 508. The gate of nMOS transistor 508 is coupled to the output of power-down detection circuit 502 and the source of nMOS transistor 508 is coupled to ground. Output 512 is provided at the output of inverter 506. Inverters 504 and 506 may be powered by VDD1 514 and VDD2 516 respectively.

Interface circuit 500 is designed to interface a circuit block operating in the VDD1 514 power domain coupled to input 510 with a circuit block operating in the VDD2 516 power domain coupled to output 512. Particularly, interface circuit 500 is configured to detect when a circuit block operating in the VDD1 514 power domain is powering down, and in response to detecting a power down state, assert a defined logic state corresponding with a digital one value at output 512. In this manner, the I/O interface between a powered down circuit block operating in the VDD1 514 power domain and an active circuit block operating in the VDD2 516 power domain has a defined logic state at all times. In certain embodiments, interface circuit 500 may be used to interface a circuit integrated within the dual port devices 106 and 206 illustrated respectively in FIG. 1 and FIG. 2 with external circuits embedded within electronic circuits 100 and 200 (i.e., application processors, baseband processors, ect.)

When the circuit block operating in the VDD1 514 power domain is active, interface circuit 500 operates as a transfer gate (i.e., two serially linked inverters) between input 510 and output 512. When the circuit block operating in the VDD1 514 power domain coupled to input 510 enters a power down state, however, the output of power-down detection circuit 502 is asserted. This in turn causes the input of inverter 506 to be pulled down to ground via nMOS transistor 508. As inverter 506 is powered in the VDD2 516 power domain, when the input of inverter 506 is pulled down to ground, interface output 512 is set to a defined logic state corresponding with a digital one value and remains at this defined state while the idle circuit block coupled to input 510 is in a powered down state. In this manner, the I/O interface between the powered down circuit block coupled to input 510 and the active circuit block coupled to output 512 has a defined logic state at all times.

In certain embodiments, interface circuit 500 is configured to reduce the power consumption of the active circuit block operating in the VDD2 power domain as the circuit block operating in the VDD1 power domain is powered down. For example, in the transition to zero state, the output of inverter 504 is dragged to ground by nMOS transistor 508, which is turned on in response to the assertion of a power down signal from power down detection circuit 502. This process may decreases the time when both pMOS and nMOS transistors of inverter 506 are turned on.

Figure 6:
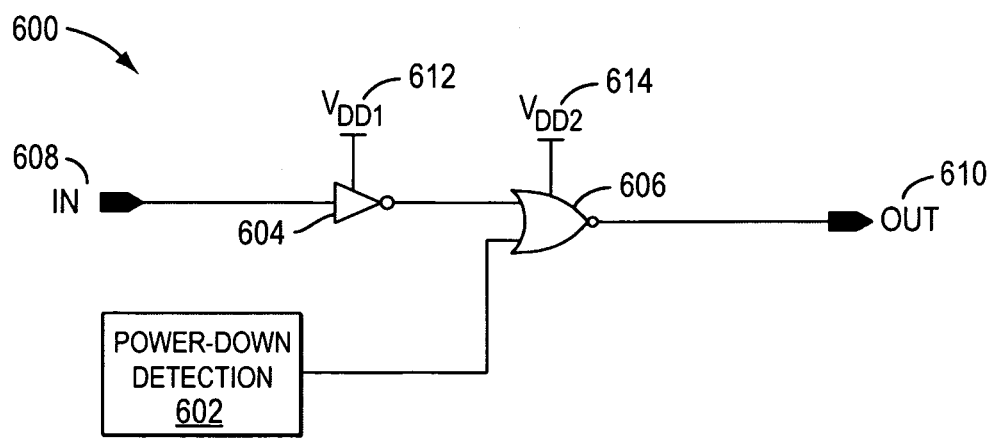
FIG. 6 illustrates a schematic diagram of an exemplary interface circuit consistent with embodiments of the present invention.

FIG. 6 illustrates a schematic diagram of an exemplary interface circuit 600 consistent with embodiments of the present invention. Interface circuit 600 may be utilized as interfaces 114-120 of FIG. 1 or interfaces 216-230 of FIG. 2. Interface circuit 600 includes input 608, inverter 604, NOR gate 606, VDD1 power input 612, VDD2 power input 614, power-down detection circuit 502, and output 610. In certain embodiments (e.g., when VDD1≥VDD2), power-down detection circuit 502 may be as simple as an inverter powered by VDD2 614 having its input coupled to VDD1 612. In certain other embodiments, exemplary interface circuit 600 may be a digital circuit having similar functionality to interface circuit 600 as shown in FIG. 6.

As illustrated in FIG. 6, input 610 is coupled to the input of inverter 604. The output of inverter 604 is coupled to one of the inputs of NOR gate 606. The output of power down detection circuit 602 is coupled to the other input of NOR gate 606. Output 610 is provided at the output of NOR gate 606. Inverter 604 and NOR gate 606 may be powered by VDD1 612 and VDD2 614 respectively.

Interface circuit 600 is designed to interface a circuit block operating in the VDD1 612 power domain coupled to input 608 with a circuit block operating in the VDD2 614 power domain coupled to output 610. Particularly, interface circuit 600 is configured to detect when a circuit block operating in the VDD1 612 power domain is powering down, and in response to detecting a power down state, assert a defined logic state corresponding with a digital zero value at output 610. In this manner, the I/O interface between a powered down circuit block operating in the VDD1 612 power domain and an active circuit block operating in the VDD2 614 power domain has a defined logic state at all times. In certain embodiments, interface circuit 600 may be used to interface a circuit integrated within dual port devices 106 and 202 illustrated respectively in FIG. 1 and FIG. 2 with external circuits embedded within electronic circuits 100 and 200 (i.e., application processors, baseband processors, ect.).

When the circuit block operating in the VDD1 612 power domain coupled to input 608 is active, interface circuit 600 operates as a transfer gate between input 608 and output 610. When the circuit block operating in the VDD1 612 power domain coupled to input 608 enters a power down state, however, the output of power-down detection circuit 602 is asserted. As the output of power-down detection circuit is coupled to one of the inputs of NOR gate 606, when the output of power-down detection circuit is asserted, interface output 610 is set to a defined logic state corresponding with a digital one value and remains at this defined state while the idle circuit block coupled to input 608 is in a powered down state (i.e., as long as the output of power-down detection circuit 602 is asserted). In this manner, the I/O interface between the powered down circuit block coupled to input 608 and the active circuit block coupled to output 610 has a defined logic state at all times.

In certain embodiments, interface circuit 600 is configured to reduce the power consumption of the active circuit block operating in the VDD2 power domain as the circuit block operating in the VDD1 power domain is powered down. For example, as the output of inverter 604 transitions to zero during power down of VDD1 and the output of power down detection circuit 602 is asserted, a pMOS transistor integrated in NOR gate 606 may be turned off, thereby reducing leakage current interface circuit 600 as VDD1 powers down.

Figure 7:
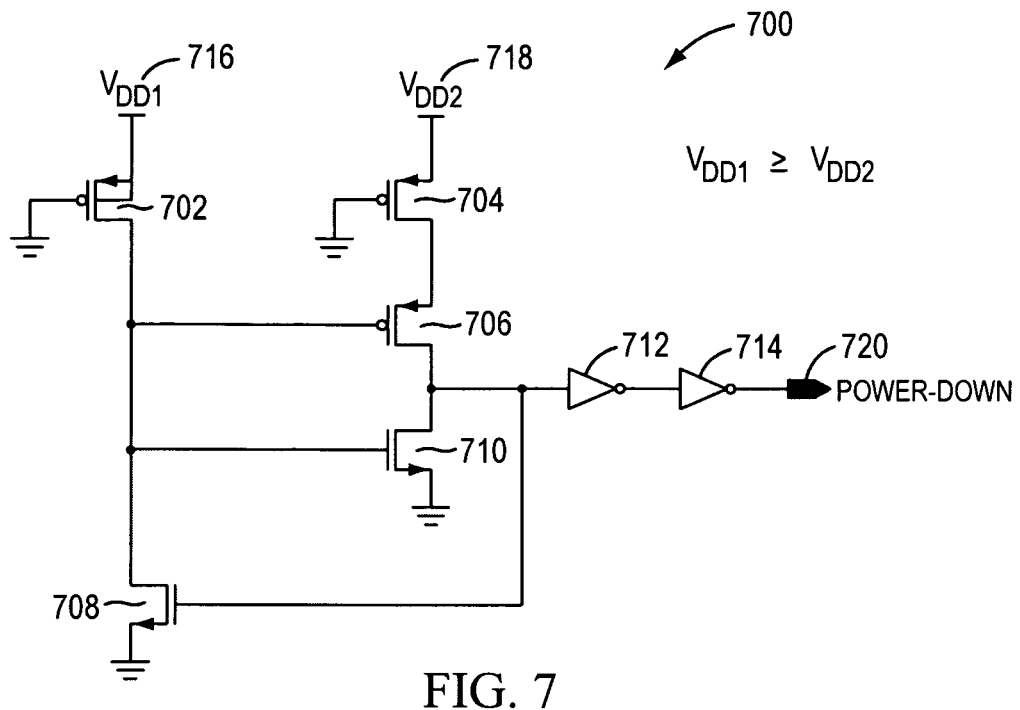
FIG. 7 illustrates a schematic diagram of an exemplary power-down detection circuit consistent with embodiments of the present invention.

FIG. 7 illustrates a schematic diagram of an exemplary power-down detection circuit 700 consistent with embodiments of the present invention. Power-down detection circuit 700 may be utilized as power-down detection circuit 502 of FIG. 5 or power down-detection circuit 602 of FIG. 6. Particularly, power-down detection circuit 700 is configured to detect the powering down of a circuit block operating in a power domain denoted as VDD1 and to assert a power-down detection signal in a power domain denoted as VDD2, wherein VDD1≥VDD2 and VDD1 is capable of being powered down. Power-down detection circuit 700 includes VDD1 power input 716, VDD2 power input 718, pMOS transistors 702-706, nMOS transistors 708-710, inverters 712-714, and output 720. In certain embodiments, pMOS transistor 702 may be a low threshold voltage transistor. In certain embodiments, pMOS transistor 704 may be replaced with a resistor.

As illustrated in FIG. 7, the sources of pMOS transistors 702 and 704 are respectively coupled to VDD1 716 and VDD2 718. The gates of pMOS transistors 702 and 704 are coupled to ground. The drain of pMOS transistor 702 is coupled to the gate of pMOS transistor 706, the gate of nMOS transistor 710, and the drain of nMOS transistor 708. The drain of pMOS transistor 704 is coupled to the source of pMOS transistor 706. The drain of pMOS transistor 706 is coupled to the drain of nMOS transistor 710, the gate of nMOS transistor 708, and the input of inverter 712. The sources of nMOS transistors 708-710 are coupled to ground. The output of inverter 712 is coupled to the input of inverter 714. The output 720 of power-down detection circuit 700 is provided at the output of inverter 714.

As discussed above, power-down detection circuit 700 is configured to detect the powering down of a circuit block operating in the VDD 1 716 power domain and to assert a power-down detection signal in the VDD2 718 power domain. Particularly, when VDD1 716 is powered down and VDD2 718 remains active, power-down detection circuit 700 operates to pull the input of inverter 712 up to VDD2 718, thereby causing output 720 to be asserted until VDD1 716 is powered back up. In this manner, power-down detection circuit 700 may be integrated within interface circuits 500 and 600 respectively illustrated in FIG. 5 and FIG. 6.

In certain embodiments, power-down detection circuit 700 is configured to reduce the power consumption of the active circuit block operating in the VDD2 power domain as the circuit block operating in the VDD1 power domain is powered down. For example, as VDD1 transitions to zero, nMOS transistor 708 is turned on, dragging the input of the inverter formed by pMOS transistor 706 and nMOS transistor 710 to zero, as the current through pMOS transistor 706 and nMOS transistor 710 becomes higher.

Figure 8:
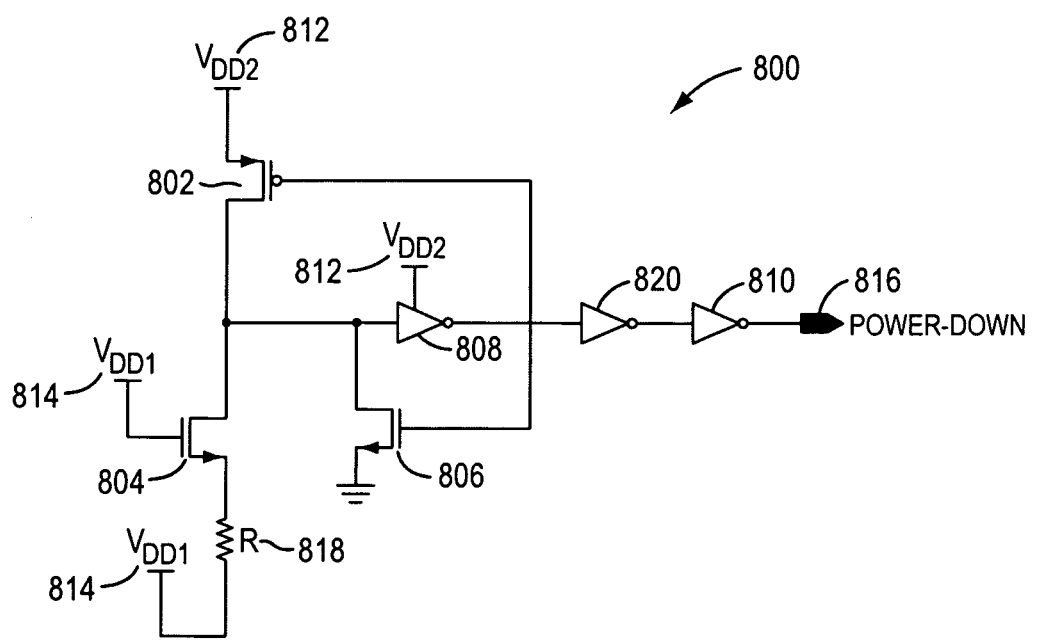
FIG. 8 illustrates a schematic diagram of another exemplary power-down detection circuit consistent with embodiments of the present invention.

FIG. 8 illustrates a schematic diagram of exemplary power-down detection circuit 800 consistent with embodiments of the present invention. Power-down detection circuit 800 may be utilized as power-down detection circuit 502 of FIG. 5 or power down-detection circuit 602 of FIG. 6. Particularly, power down detection circuit 800 is configured to detect the powering down of a circuit block operating in power domain denoted as VDD1 and to assert a power-down detection signal in a power domain denoted as VDD2, where VDD1 is capable of being powered down. Power-down detection circuit 800 includes VDD1 power input 814, VDD2 power input 812, pMOS transistor 802, nMOS transistors 804 and 806, resistor 818, inverters 808-810 and 820, and output 816. In certain embodiments, pMOS transistor 802 and nMOS transistor 806 may be weak transistors. In certain embodiments, resistor 818 may be replaced by a pMOS transistor having its gate coupled to ground.

As illustrated in FIG. 8, the source of pMOS transistor 802 is coupled to VDD2 812. The drain of pMOS transistor 802 is coupled to the drains of nMOS transistors 804-806 and the input of inverter 808. The gate of nMOS transistor 804 is coupled to VDD1 814. The source of pMOS transistor 804 is coupled to VDD1 814 via resistor 818. The gate of pMOS transistor 802 is coupled to the gate of nMOS transistor 806. The source of nMOS transistor 806 is coupled to ground. The output of inverter 808 is coupled to the input of inverter 820. The output of inverter 820 is coupled to the input of inverter 810. The output 816 of power-down detection circuit 800 is provided at the output of inverter 810.

As discussed above, power-down detection circuit 800 is configured to detect the powering down of a circuit block operating in the VDD1 814 power domain and to assert a power-down detection signal in the VDD2 812 power domain. Particular, when VDD1 814 is powered down, power-down detection circuit 800 operates to pull the output of inverter 808 up to VDD2 812, thereby causing output 816 to be asserted until VDD1 814 is powered back up. In this manner, power-down detection circuit 800 may be integrated within interface circuits 500 and 600 respectively illustrated in FIG. 5 and FIG. 6.

In certain embodiments, power-down detection circuit 800 is configured to reduce the power consumption of the active circuit block operating in the VDD2 power domain as the circuit block operating in the VDD1 power domain is powered down. nMOS transistor 806 operates similarly to nMOS transistor 708 as illustrated in FIG. 7.

In certain embodiments, interface circuits 300 and 400 as illustrated in FIGS. 3 and 4, respectively, may be implemented in an electronic device 100 where the last digital state received by dual port device 106 before power down of the external circuit block is stored (e.g., latched). If the signal received by dual port device 106 is, for example, a chip select signal or other signal that should be switched to a particular state upon power down of the external circuit block, interface circuits 500 and 600 as illustrated in FIGS. 5 and 6, respectively, can be utilized to set the output signal to the particular state. If application processor 102 or 104 can set signals such as chip select before power down, then interface circuits 300 and 400 can be utilized for signal lines that are set at a particular state before power down.

In the preceding specification, various preferred embodiments have been described with reference to the accompanying drawings. It will, however, be evident that various modifications and changes may be made thereto, and additional embodiments may be implemented, without departing from the broader scope of the invention as claimed. The specification and drawings are accordingly to be regarded in an illustrative rather than restrictive sense.

What is claimed is:
1. An integrated circuit comprising:
an input/output (I/O) port;

an external circuit block coupled to the I/O port and configured to operate on a first supply voltage;

a first interface circuit coupled to the I/O port and configured to operate on the first supply voltage;

a second interface circuit coupled to the I/O port and configured to operate on a second supply voltage;

a first circuit block coupled to the first interface circuit and the second interface circuit and configured to operate on the second supply voltage; wherein:

the first interface circuit is configured to provide a first defined logic state to the external circuit block when the second power supply is switched off and the first circuit block is powered down and the second interface circuit is configured to provide a second defined logic state to the first circuit block when the first power supply is switched off and the external circuit block is powered down.

2. The integrated circuit of claim 1, wherein the first defined logic state provided by the first interface circuit is the last logic state received from the first circuit block prior to powering down and the second defined logic state is the last logic state provided by the external circuit block prior to powering down.

3. The integrated circuit of claim 2, wherein the second interface circuit comprises:

a voltage translating circuit, the voltage translating circuit configured to translate a logic state received from the external circuit block at the voltage level of the first supply voltage into a corresponding translated logic state at the voltage level of the second supply voltage; and a latch circuit coupled to the voltage translating circuit, the latch circuit configured to store the last translated logic state at the voltage level of the second supply voltage translated before the first supply voltage is powered down.

4. The integrated circuit of claim 2, wherein the first interface circuit comprises:

a voltage translating circuit, the voltage translating circuit configured to translate a logic state provided by the first circuit block at the voltage level of the second supply voltage into a corresponding translated logic state at the voltage level of the first supply voltage; and a latch circuit coupled to the voltage translating circuit, the latch circuit configured to store the last translated logic state at the voltage level of the first supply voltage translated before the second supply voltage is powered down.

5. The integrated circuit of claim 1, wherein the first and second defined logic states comprise a logical zero value.

6. The integrated circuit of claim 1, wherein the first and second defined logic states comprise a logical one value.

7. The integrated circuit of claim 1, wherein the second interface circuit comprises:

a power down detection circuit configured to assert a power down detection signal in response to detecting the shutting off of the first supply voltage and the powering down of the external circuit block; and a driver circuit coupled to the power down detection circuit, the driver circuit being configured to assert the second defined output logic state at the voltage level of the second supply voltage in response to the power down detection signal being asserted.

8. The integrated circuit of claim 1, wherein the first interface circuit comprises:

a power down detection circuit configured to assert a power down detection signal in response to detecting the shutting off of the second supply voltage and the powering down of the first circuit block; and a driver circuit coupled to the power down detection circuit, the driver circuit being configured assert the first defined output logic state at the voltage level of the first supply voltage in response to the power down detection signal being asserted.

9. A method for managing power consumption in an electronic device, the method comprising:

receiving, at an interface circuit in an integrated circuit, a digital signal at a first voltage level from an external circuit block operating at the first voltage level;

translating the received digital signal at the first voltage level into a corresponding translated digital signal at a second voltage level;

storing the translated digital signal at the second voltage level;

powering down the external circuit block; and providing the stored translated digital signal at the second voltage level to a first circuit block in the integrated circuit operating at the second voltage level.

10. A method for managing power consumption in an electronic device, the method comprising:

detecting, by an interface circuit of an integrated circuit, the powering down of a first circuit block in the integrated circuit operating on a first supply voltage;

providing, to an external circuit block operating on a second supply voltage, the external circuit block being coupled to the first circuit block by the interface circuit, a defined logic state in response to detecting the powering down of the first circuit block; and turning off at least one circuit in the interface circuit in response to detecting the powering down of the first circuit block to reduce the power consumption of the external circuit block.

11. The method of claim 10, wherein the defined logic state provided to the external circuit block is a logical zero value.

12. The method of claim 10, wherein the defined logic state provided to the external circuit block is a logical one value.

13. The method of claim 12, wherein the defined logic state is provided to the external circuit block at the level of the second supply voltage.

14. A method of managing power consumption in an electronic device, the method comprising:

detecting, by an interface circuit of an integrated circuit, a powering down of an external circuit block operating on a first supply voltage;

providing, to a first circuit block in the integrated circuit operating on a second supply voltage, the external circuit block being coupled to the first circuit block by the interface circuit, a defined logic state in response to detecting the powering down of the external circuit block; and turning off at least one transistor in the interface circuit in response to detecting the powering down of the external circuit block to reduce the power consumption of the first circuit block.

15. The method of claim 14, wherein the defined logic state provided to the first circuit block is a logical zero value.

16. The method of claim 14, wherein the defined logic state provided to the first circuit block is a logical one value.

17. The method of claim 16, wherein the defined logic state is provided to the first circuit block at the level of the second supply voltage.

* * * * *